March 27, 1934.  G. E. BROFELTH  1,952,970
RESILIENT SHAFT COUPLING
Filed Feb. 24, 1932   2 Sheets-Sheet 1
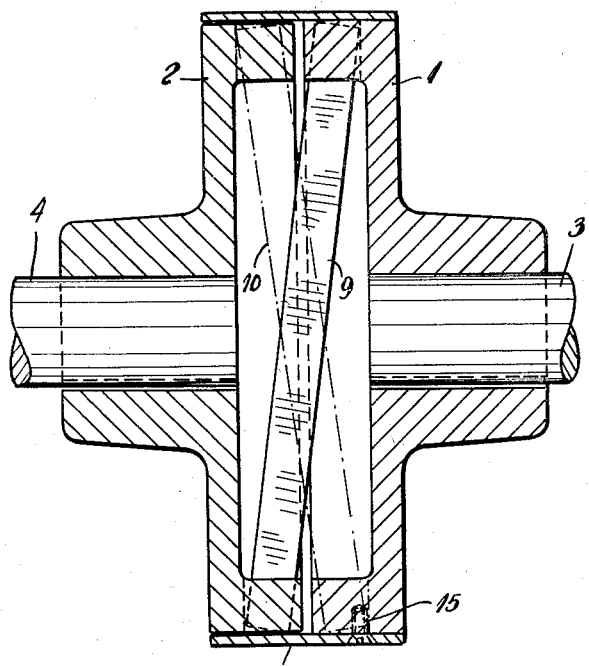
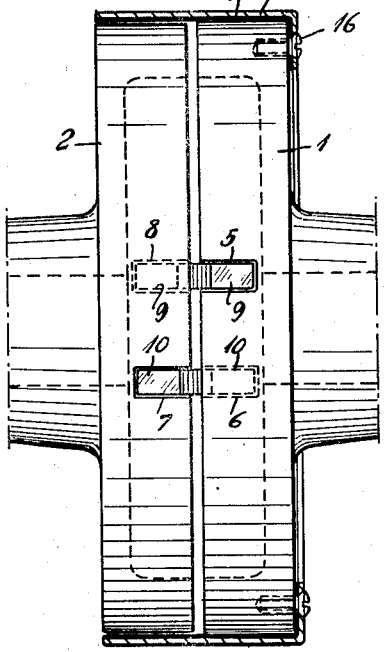
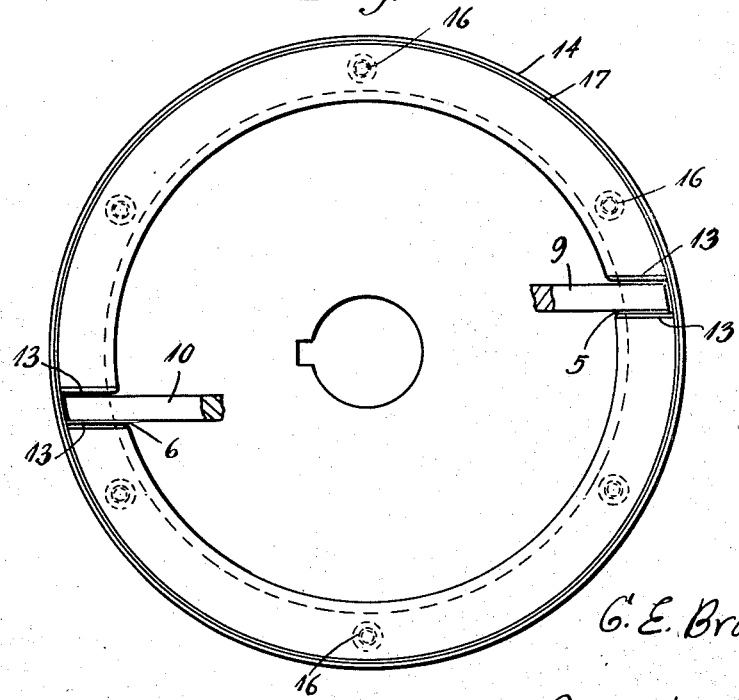

March 27, 1934.   G. E. BROFELTH   1,952,970
RESILIENT SHAFT COUPLING
Filed Feb. 24, 1932   2 Sheets-Sheet 2
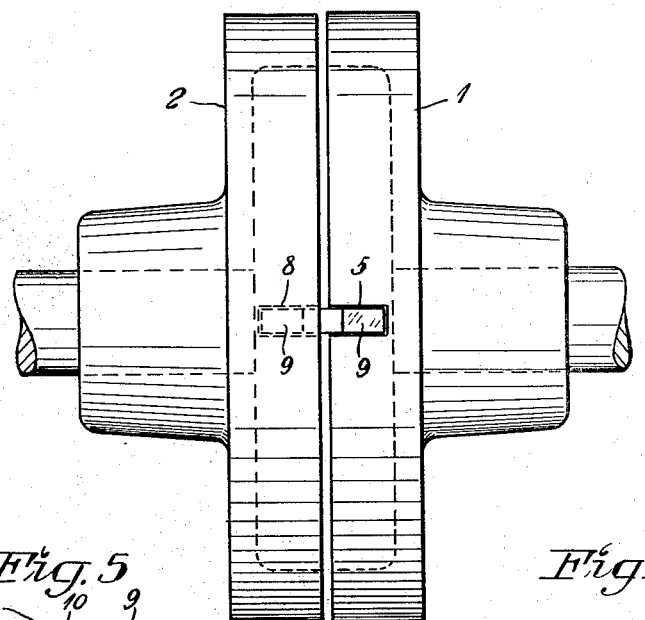
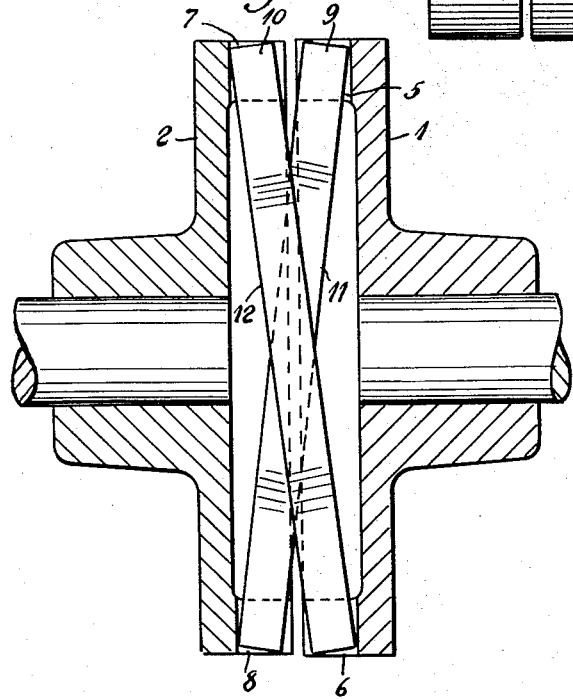
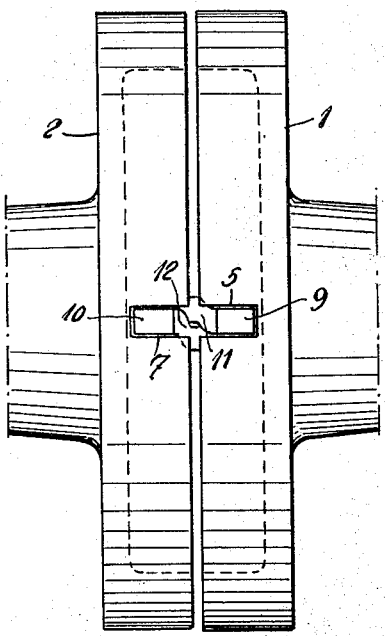
G. E. Brofelth
INVENTOR
By: Marks & Clerk
ATT'YS Patented Mar. 27, 1934

1,952,970

UNITED STATES PATENT OFFICE 1,952,970

RESILIENT SHAFT COUPLING

Gustav Emanuel Brofelth, Halmstad, Sweden, assignor to Aktiebolaget Malcus Holmquist, Halmstad, Sweden, a joint-stock company of Sweden Application February 24, 1932, Serial No. 594,860
In Sweden June 7, 1930

7 Claims. (Cl. 64—96)

The present invention refers to resilient shaft couplings of the type consisting of a driving disk member facing a driven disk member and flexibly connected thereto for the purpose of resiliently transmitting motion from a driving shaft to a driven shaft, and the invention has for its object to provide certain improvements in said type of coupling.

According to the invention, the disk members of the coupling are provided with substantially diametrically opposed axial grooves adapted to receive the end portions of resilient means, such as spring bars or the like, and to hold said end portions without any screw connections or similar fastenings apt to cause fatiguing and deterioration of the spring material.

Other features of the invention will appear from the following description with reference to the accompanying drawings which illustrate a few embodiments of the invention by way of example.

In the drawings:—

Figure 1 represents a longitudinal section of one embodiment of the coupling according to the invention, and Figure 2 is a plan view thereof.

Figure 3 shows one of the coupling members of said embodiment viewed from left to right in Figure 2.

Figure 4 is a plan view of a second embodiment of the invention.

Figures 5 and 6 are a longitudinal section and a plan view respectively of a third embodiment.

With reference to Figures 1 and 2, it will be seen that the coupling comprises two disk-like members 1 and 2 integral with hub portions secured each to a shaft 3 and 4 respectively, the coupling members facing one another at a certain mutual distance.

In the example shown, the coupling member 1 is flanged and provided with two diametrically opposed axial grooves, preferably in the form of open channels 5 and 6 extending through the flange, the coupling member 2 being also flanged and provided with two similar grooves 7 and 8.

Viewed in the axial direction, the grooves 5 and 6 of the coupling member 1 are angularly displaced, by a suitable amount relatively to the nearest grooves 7 and 8 respectively of the coupling member 2, as shown in Fig. 2. Resilient connection between the two coupling members is afforded by two springs 9 and 10, the one of which 9 extends between the groove 5 of coupling member 1 and the groove 8 of coupling member 2, while the other spring 10 extends between the groove 7 of coupling member 2 and the groove 6 of coupling member 1, the end portions of both springs entering the respective grooves of the two coupling members. It will be seen from Figs. 1–3 that in this construction the two springs are conceived as straight resilient bars extending laterally of the axis of the coupling parallel to and at some distance from each other as determined by the displacement of the grooves 5 and 6 relatively to the grooves 7 and 8 respectively.

It will be seen that the inner ends of the grooves terminate at the inner portions of the flanges so that the bottoms of the grooves are in reality a continuation of the outer face of the discs proper. By this arrangement the grooves form substantial pockets so as to completely house the ends of the springs.

In the modified construction shown in Fig. 4, coupling member 1 is provided with one radial groove 5 only and coupling member 2 similarly with a single radial groove 8, said grooves being displaced by 180 degrees relatively to each other, and the two coupling members being connected by a single, preferably straight spring bar 9 intersecting the axis of the coupling and entering with its end portions into the two grooves.

According to the third embodiment illustrated in Figs. 5 and 6, the individual coupling members 1 and 2 are each provided with two diametrically opposed radial grooves 5, 6 and 7, 8 respectively, as in the construction shown in Figs. 1–3.

In difference, however, from the arrangement according to Fig. 2 the grooves 5 and 6 of coupling member 1 are not angularly displaced relatively to the grooves 7 and 8 respectively of coupling member 2, but are situated right opposite the latter grooves in one and the same axial plane. Flexible connection between the two coupling members is provided by two spring bars 9 and 10 thrust into and extending between the grooves 5, 8 and 7, 6 respectively as in the first described embodiment. In the last described construction, however, where all of the grooves are in the same axial plane and any straight spring bars would meet and interfere with each other at the center of the coupling, the springs actually used are curved at their central portions, as indicated at 11 and 12 in the drawings, so as to extend freely past one another.

The springs used in all of the embodiments described are conceived as steel bars, but any other suitable resilient material may be employed for the springs, or any of them, as the case may be. A flattened shape of the spring bars with a rectangular cross section may be preferred in some constructions, while in others a circular or other cross section may be found more serviceable.

In small couplings of the type described, both coupling members 1 and 2 may be made from hard rubber, and in large couplings where the springs are subjected to severe stresses, the bearing surfaces of the grooves taking up the pressure of the springs may be covered with rubber or leather as indicated at 13 in Fig. 3. This rubber or leather covering also contributes toward silent running.

To prevent the springs, in the constructions shown, from falling out through the outwardly open grooves, where such are used to receive the end portions of the springs, a circumferential sleeve or drum 14 may be secured to one of the coupling members, such as member 1, which is of slightly greater diameter than the other coupling member, such as member 2, a small clearance being thus provided between the sleeve and the latter coupling member. The sleeve may be fixed, for instance, by a radial screw, as shown in Fig. 1, or preferably by an axially extending screw 16, as shown in Fig. 2, the sleeve being in the latter case provided with a radially extending flange, as illustrated. Where silent running or electrical insulation is aimed at, an intervening layer 17 of leather or other suitable material may be provided.

The function of the coupling, that is to say the manner in which the springs transmit a rotary movement from the one coupling member to the other will be understood without further explanation, with reference to the drawings and the description hereinbefore.

What I claim is:

1. A resilient shaft coupling, comprising in combination, two disk members facing each other, flange portions on said disk members directed against each other to form a substantially closed space between the disk members, said flange portions having each axial grooves on opposite sides of the axis of rotation of the coupling, and spring members extending each from within a groove of the one disk member through said space into a groove of the other disk member on the opposite side of said axis to resiliently connect said disk members, and said grooves having their bottom portions flush with the faces of the disc members in order that the depth will be sufficient to completely house the ends of the said spring members and form substantial receiving pockets therefor.

2. A resilient shaft coupling, comprising in combination, two disk members facing each other, flange portions on said disk members directed against each other to form a substantially closed space between the disk members, said flange portions having each diametrically opposed axial grooves each of which is angularly displaced relatively to the nearest groove in the flange of the adjacent disk member, and spring members extending in parallel planes from within each groove of the one disk member through said space into the corresponding groove of the other disk member on the opposite side of the axis of rotation of the coupling to resiliently connect said disk members.

3. A resilient shaft coupling, comprising in combination, a flanged disk member facing another flanged disk member of smaller diameter than the first disk member, the flange portion of each disk member being grooved axially, resilient means extending from within a groove in the flange of the one disk member into a groove in the flange of the other disk member on the opposite side of the axis of rotation of the coupling, and a circumferential sleeve on the flange of the larger disk member, extending with a clearance over the flange of the smaller disk member.

4. A resilient shaft coupling, comprising in combination, a flanged disk member facing another flanged disk member of smaller diameter than the first disk member, the flange portion of each disk member having diametrically opposed axial grooves each of which is angularly displaced relatively to the nearest groove in the flange of the adjacent disk member, spring members extending in parallel planes from within each groove of the one disk member into the corresponding groove of the other disk member on the opposite side of the axis of rotation of the coupling, and a circumferential sleeve on the flange of the larger disk member, extending with a clearance over the flange of the smaller disk member.

5. A resilient shaft coupling, comprising in combination, a flanged disk member facing another flanged disk member of smaller diameter than the first disk member, the flange portion of each disk member being grooved axially, resilient means extending from within a groove in the flange of the one disk member into a groove in the flange of the other disk member on the opposite side of the axis of rotation of the coupling, a circumferential sleeve on the flange of the larger disk member, extending with a clearance over the flange of the smaller disk member, and a layer of acoustic or electrical insulating material next to the sleeve on the inside thereof.

6. A resilient shaft coupling, comprising in combination, two disk members facing each other and provided with substantially diametrically opposed axial grooves, and independent flat resilient members extending directly and substantially diagonally from one disk member to the other and entering said grooves to resiliently connect said members.

7. A resilient shaft coupling, comprising in combination, two flanged disk members facing each other and provided with circumferential grooves in the flange portions thereof on opposite sides of the axis of rotation of the coupling, and independent resilient means extending freely and directly from within the groove of the one disk member into the groove of the other disk member on the opposite side of said axis to resiliently connect said disk members.

GUSTAV EMANUEL BROFELTH.